United States Patent [19]

Perego

[11] Patent Number: 5,340,048
[45] Date of Patent: Aug. 23, 1994

[54] METHOD AND APPARATUS FOR CUTTING AND SPLICING TAPE IN AUTOMATIC CASSETTE LOADING MACHINES

[75] Inventor: Luciano Perego, Milan, Italy

[73] Assignee: Tapematic U.S.A., Inc., Orlando, Fla.

[21] Appl. No.: 55,148

[22] Filed: Apr. 29, 1993

[30] Foreign Application Priority Data

Apr. 29, 1992 [IT] Italy .................. MI92A1019
Aug. 28, 1992 [IT] Italy .................. MI92A2026

[51] Int. Cl.⁵ .................................... B65H 19/22
[52] U.S. Cl. .................................... 242/527; 156/502; 156/506; 242/532.1
[58] Field of Search .......... 242/56 R; 156/157, 159, 156/502, 505, 506

[56] References Cited

U.S. PATENT DOCUMENTS

| | | | |
|---|---|---|---|
| 4,629,138 | 12/1986 | Kubo | 242/56 R |
| 4,682,742 | 7/1987 | Woodley et al. | 242/56 R |
| 4,770,359 | 9/1988 | Kiuchi | 242/56 R |
| 4,974,785 | 12/1990 | Woodley et al. | 242/56 R |
| 5,125,587 | 6/1992 | Perego | 242/56 R |
| 5,125,588 | 6/1992 | Perego | 242/56 R |
| 5,176,332 | 1/1993 | Woodley et al. | 242/56 R |

Primary Examiner—John M. Jillions
Attorney, Agent, or Firm—Edgar H. Haug; Adam L. Brookman

[57] ABSTRACT

A cutting and splicing unit has first, second and third blocks arranged to hold a leading portion and a trailing portion of a leader extracted from an access opening of a cassette being processed. The second and third blocks, which are integral with each other, can be individually disposed close to the first block through a movement parallel to a front panel in a direction perpendicular to the cassette access opening. A gripper member passes over the blocks to pick up a piece of adhesive tape supplied from a supply unit located in front of the front panel while a blade fastened to the gripper member severs the leader or the magnetic tape laid on the blocks. The simultaneous lifting of the blocks applies the adhesive tape to a junction area.

22 Claims, 5 Drawing Sheets

FIG 4

METHOD AND APPARATUS FOR CUTTING AND SPLICING TAPE IN AUTOMATIC CASSETTE LOADING MACHINES

FIELD OF INVENTION

The present invention relates generally to machines for loading tape into cassettes and more particularly to a method and apparatus for cutting and splicing tape for use with automatic cassette loading machines.

BACKGROUND OF THE INVENTION

Unfilled audio and video tape cassettes essentially comprise a shell made of plastic material, rotatably housing first and second winding hubs, around which a leader tape of predetermined length is wound. The leader tape extends along an access opening formed in the shell and is optionally protected by an openable lid.

In industrial processes for making these cassettes, automatic machines are currently used in which magnetic tape is fed from a supply reel and guided to a loading station in which the cassettes being processed are individually engaged. At the loading station, the cassettes are loaded with a predetermined amount of magnetic tape and then discharged onto a conveyor or other means to move them away from the loading machine.

Prior to being loaded with tape, cassettes reaching the loading station are acted upon by extractor means which takes the leader out via the cassette access opening to submit the leader to the action of a cutting and splicing unit.

The cutting and splicing unit is generally arranged such that it engages the leader and magnetic tape on first, second and third supporting surfaces formed in two or more blocks. In greater detail, the first supporting surface is formed on a first block which is fixed relative to a front panel of the loading machine. The second and third supporting surfaces, formed on one or two movable blocks, can be individually and selectively moved close to the first supporting surface and aligned in coplanar relation therewith. Typically, when the leader is extracted from the cassette, the first and second supporting surfaces are aligned in coplanar relation with each other to receive the leader thereon. The leader is generally retained on the support surfaces by suction produced through holes in the surfaces.

A movable blade then cuts the leader into a leading portion and a trailing portion which is connected to the first and second winding hubs, respectively.

At this point, the movable block or blocks are moved to cause the first supporting surface carrying the leading portion of the cut leader to be aligned in coplanar relation with the third supporting surface holding the magnetic tape end from the supply reel which is mounted on the loading machine. The ends of the magnetic tape and leading portion of the leader, aligned end-to-end, are spliced together with a piece of adhesive tape carried by an applicator member which has received the tape from a supply unit. The supply unit pulls the adhesive tape from a feed roll, moves it forward and cuts it into pieces of predetermined length in conjunction with each work cycle of the applicator member.

When splicing has been completed, the first winding hub is driven in rotation to cause the winding of a predetermined amount of magnetic tape into the cassette. When the winding is complete, the magnetic tape extending on the first and third supporting surfaces is cut by the movable blade. The positioning between the third and second supporting surfaces is then changed so that the trailing portion of the leader is moved into alignment with the end of the cut magnetic tape located on the first supporting surface and then spliced to the end of the magnetic tape by application of another piece of adhesive tape carried by the applicator member.

The trailing portion of the leader and end portion of the adhesive tape remaining outside the cassette shell are wound into the cassette and the cassette is ejected from the loading station.

Several different types of cutting and splicing units are available. While these units are similar in manufacturing and operating concept, they have different structural and practical features that are selected depending upon the type of cassettes being processed and the length of the leader therein.

"Philips type" audio cassettes have a relatively long leader. When these cassettes are to be processed, the blocks carrying the leader and the magnetic tape supporting surfaces are generally spaced apart sideways relative to the loading station. Typically, the second and third supporting surfaces are formed on a single movable block disposed close to the fixed block and movable perpendicularly to the front panel of the machine in order to selectively align the second or third supporting surfaces with the first supporting surface.

Video tapes of the "VHS" and "BETA" formats have a shorter leader than Philips cassettes. In machines designed to load these cassettes the blocks carrying the supporting surfaces usually located very close to the front of the access opening of the cassette when the cassette is in place in the loading station. In addition, the blocks are simultaneously movable close to and away from the front panel of the machine so that, on splicing, the supporting surfaces carrying the tape and leader to be spliced are disposed in vertical alignment relation with the applicator member associated with the adhesive tape supply unit, the latter being disposed behind the cassette being processed.

Audio and/or video cassettes, of the "VIDEO 8" and "DAT" format have a leader which is very short. In fact, the length of the leader is so reduced that it is impossible to move the blocks sideways in order to align them with the applicator member, as described with reference to "VHS" cassettes.

A cutting and splicing unit envisaged to work under the above conditions is disclosed in U.S. Pat. No. 4,974,785. In this cutting and splicing unit the second and third supporting surfaces are formed on a second and third blocks respectively, that are movable independently of each other close to and apart from the first block, fastened to the front panel very close to the access opening of the cassette being processed. In greater detail, the second block is movable in the longitudinal extension direction of the leader between one position, in which it is close to the first block and a second position in which it is spaced apart from the first block. Located in the gap defined between the first block and second block and spaced apart from the first block is a third block which is movable in a direction perpendicular to the extension of the leader extracted from the cassette. The cutting member moves through an opening of the front panel in a direction at right angles to the longitudinal extension of the leader.

The adhesive tape supply unit is located behind the front panel of the machine with the applicator member reaching the junction area between the blocks through an opening formed in the machine's front panel.

While, this cutting and splicing unit is capable of operating with very short leaders, it does have several drawbacks. For example, the magnetic tape which comes from the reel must be threaded through a rather tortuous path between several idler rollers. In fact, after the tape passes beyond the control and counter unit it passes over a first idler roller and then, before reaching the third supporting surface, it must make a complete turn around the third block. This is very undesirable, in that each element which the tape must pass over represents a possible damaging factor for the tape when the cassette is being loaded. The possibility of tape damage increases when the tape is run at high speed over the elements. This speed can reach and exceed forty meters per second.

The positioning of the adhesive tape supply unit behind the front panel of the machine is also a drawback when the adhesive tape roll must be replaced. These problems are very important because of the high degree of automation presently required by tape loading operations.

In addition, the time necessary to enable the cutting member and applicator member to operate from their locations behind the front panel of the machine adversely affects productivity.

Another cutting and splicing unit is disclosed in European Patent No. 0 210 844 (corresponding to U.S. Pat. No. 4,911,774). This device comprises a fixed block having a first supporting surface on which the magnetic tape end is held. A second supporting surface holds the leading portion of the leader transversely cut by a blade. The trailing portion of the leader is kept in engagement with an extractor element that, after reaching the same level as the supporting surface to lay the leader thereon for it to be cut, goes back to the cassette access opening. This moves the trailing portion away from the block to enable the magnetic tape to be spliced to the leading portion. At the end of the tape winding operation, the extractor element puts the trailing portion on the block again to enable it to be spliced to the end portion of the tape, previously cut by the blade.

This splicing unit also has similar drawbacks. The magnetic tape slides on the block during the winding step. Further, the cutting and splicing operations are carried out individually at subsequent times, while the adhesive tape supply unit is again located behind the front panel of the machine.

SUMMARY OF THE INVENTION

Accordingly, the main object of the present invention is to eliminate the problems of the prior art by providing a cutting and splicing unit that, while being adapted to operate on very short leaders, enables the magnetic tape coming from the control and counter unit to reach the cassette access opening via a rectilinear path without passage around any fixed element.

Another object of the present invention is to provide a cutting and splicing unit which facilitates easy replacement of an empty adhesive tape roll.

A still further object of the present invention is to provide a cutting and splicing unit which operates more efficiently to speed up the cutting and splicing operations to increase the overall productivity of the loading machine.

The foregoing and further objects will become more apparent in the course of the present description.

In one aspect, the present invention is directed to an apparatus for splicing tape comprising first, second and third tape support means fixed relative to one another and extending substantially parallel to one another so that the first, second and third tape support means reside in a common plane. The invention also preferably includes means for imparting relative reciprocal movement between the first tape support means on the one hand and the second and third tape support means on the other hand and means for simultaneously imparting movement to the first, second and third tape support means to bring the first and second tape support means or the first and third tape support means, respectively, into engagement with splicing tape applicator means to thereby affix splicing tape to pieces of tape supported on the first and second tape support means or the first and third tape support means.

In another aspect the present invention is directed to a method for loading tape into cassettes comprising the steps of engaging magnetic ("use") tape on a third tape support block, extracting leader tape from a cassette located proximate a loading station, engaging the extracted leader tape on a first and a third support block, slitting the extracted leader tape between the first and second support block, shifting the second and third support blocks to align the use tape on the third support block with leader tape on the first support block, moving the first, second and third support blocks from a first position to a second position to bring the aligned use tape and leader tape into engagement with tape applicator means to affix a piece of splicing tape joining the use tape and leader tape, moving the first, second and third support blocks away from the tape applicator means, winding use tape into the cassette, slitting the use tape between the first and third support blocks, shifting the second and third support blocks to align the use tape on the first support block with the leader tape on the second support block, moving the first, second and third support blocks from the first to the second position to bring the aligned use tape and leader tape into engagement with the tape applicator means to affix a piece of splicing tape joining the use tape and leader tape, and moving the first, second and third support blocks away from the tape applicator means.

BRIEF DESCRIPTION OF THE DRAWINGS

Further features and advantages of the present invention will be better understood when reviewed in conjunction with the accompanying drawings, in which.

DESCRIPTION OF A PREFERRED EMBODIMENT

Referring to the drawings, a cutting and splicing unit for automatic cassette loading machines constructed in accordance with the present invention has been generally identified by reference numeral 1.

The cutting and splicing unit 1 is operatively located at a loading station 2 which is part of an automatic cassette loading machine (not shown as a whole). In the particular embodiment described and shown, the device 1 is combined with a loading station 2 of an automatic loading machine of the type described in U.S. Pat. No. 5,125,587 entitled Tape Loading Center in the name of the same applicant, which is incorporated herein, by reference.

Figure 1:
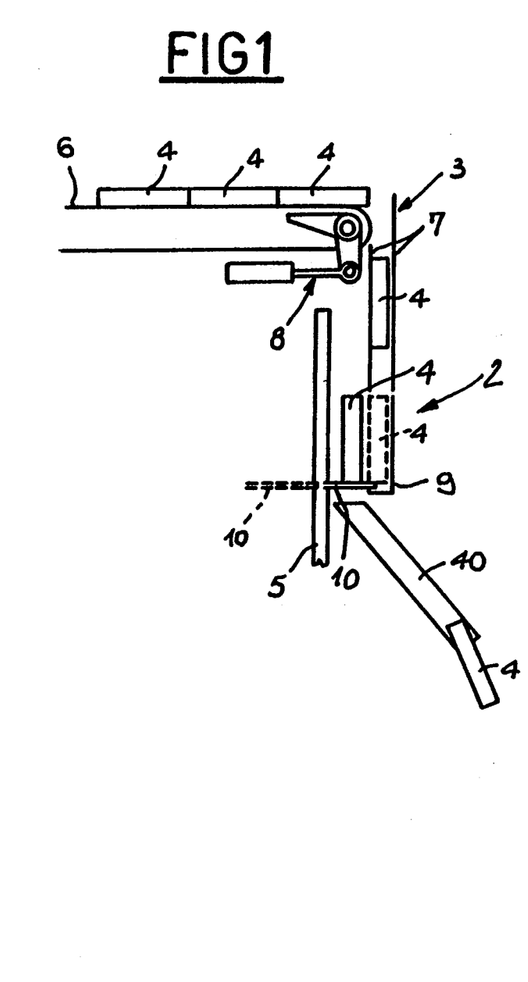
FIG. 1 is a left side view showing the path taken by cassettes processed in one embodiment of an automatic loading machine.

Associated with the loading station 2 is guide and positioning means 3 arranged to engage, at each operating cycle, an empty tape cassette 4 to hold it in a predetermined position in front of panel 5 of the loading machine. In greater detail, cassettes 4 carried by a conveyor belt 6 or equivalent feed means, approach the upper end of a pair of vertical guides 7 extending along the front panel 5. A rotating mechanism 8 executes the lifting of a cassette 4 at each operating cycle, rotating it through 90° so that the cassette is engaged in the vertical guides 7. The cassette 4 drops down along the vertical guides 7 and is engaged in a positioning plate 9 when it abuts one or more retractable stop pegs 10. Following a translation of the positioning plate 9 in the direction of the front panel 5, the cassette 4 is brought into engagement with centering and winding means (not shown) in the loading station 2.

Figure 8:
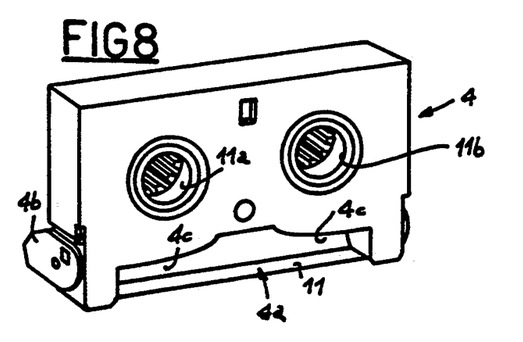
FIG. 8 is a rear perspective view of a "VIDEO 8" cassette with its protection door in an open position.

As shown by way of example in FIG. 8, each cassette 4 is provided with a leader 11 that extends across an access opening 4a formed in the cassette. The leader 11 is engaged at its opposite ends, to first and second winding hubs 11a and 11b which are rotatably engaged in the cassette 4.

A protection door 4b can be associated with the access opening 4a which, when present, is opened when the cassette 4 is engaged in the positioning plate 9 and brought toward the front panel 5.

The cutting and splicing unit 1 comprises extractor means arranged to operatively engage the leader 11 to bring it from a rest position to an extraction position in which it is extended before the access opening 4a, outside the cassette 4. The extractor means comprises at least first and second extractor pins, 12 and 13, mounted to respective drive arms, 14 and 15, pivotally mounted on the front panel 5. By respective actuators (not shown) operating on the drive arms 14 and 15, the first and second extractor pins 12 and 13 are, individually and selectively movable, from a rest position in which, following the movement of the positioning plate 9 close to the front panel 5, they enter an access space 4c formed in the cassette 4 at the opening 4a, to an operating position in which they are outside the access opening 4a to retain the leader 11 in the extracted condition.

Rotatably associated with at least the first extractor pin 12 is an idler roller 12a.

Figure 3:
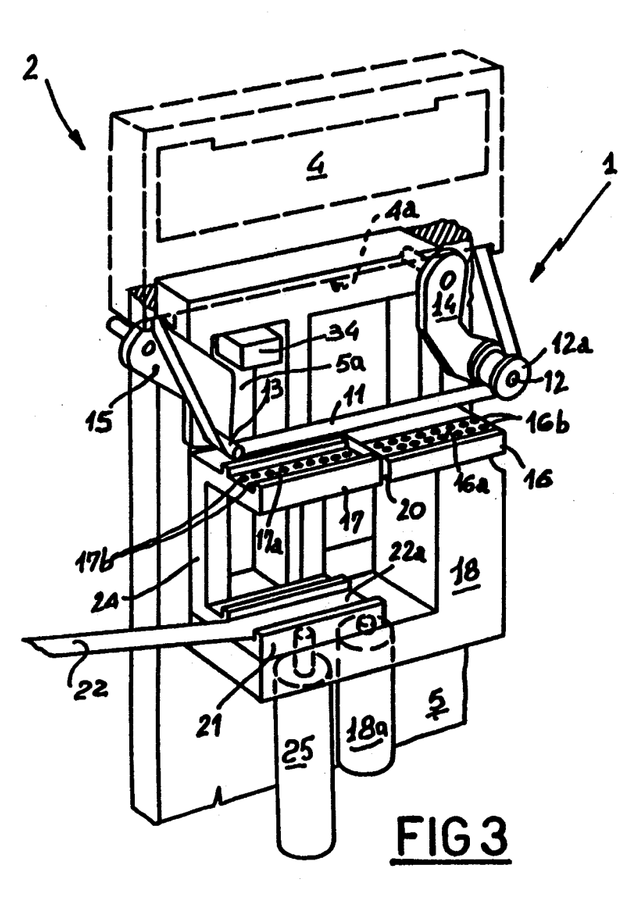
FIG. 3 is a perspective view of a portion of the cutting and splicing unit of the present invention during an extraction step when the leader is withdrawn from the cassette being processed.

As can be seen in FIG. 3, the leader 11, in the extracted condition, can be engaged on first and second supporting surfaces 16a and 17a. A first block 16 which is integral with a support frame 18 operatively mounted before the front panel 5, contains the first supporting surface 16a, while a second block 17 which, in a first operating position, is located close to the first block 16 so that the second supporting surface 17a extends in alignment with the first supporting surface 16a and in coplanar relation therewith, contains the second supporting surface 17a.

In this situation the leader 11 can be cut by first cutting means 19 which acts at right angles to the longitudinal extension of the leader 11, at a slot 20 defined between the first block 16 and second block 17 when they are in the first operating position.

The action of the cutting member 19 divides the leader 11 into a first leading portion 11c, connected to the first winding hub 11a, and a trailing portion 11d, connected to the second winding hub 11b. The ends of the leading and trailing portions 11c and 11d are held on the first and second supporting surfaces 16a and 17a, respectively by suction produced through a number of holes 16b and 17b opening into the surfaces.

The second block 17 is movable from the first position to a second operating position in which it is spaced apart from the first block 16. In particular, the second block 17, in the second operating position, is located within the access space 4c defined in the cassette 4.

A third block 21 is also provided with a third supporting surface 21a in which, by suction through holes 21b (see FIG. 6), one end 22a of a magnetic tape 22 from a supply reel (not shown) is retained, after passing through a control and counter unit 23 carrying out the measurement of the amount of tape wound in the cassette 4 being processed, as well as the adjustment of the rotational speed of the reel, based on the winding speed of the tape 22.

Figure 6:
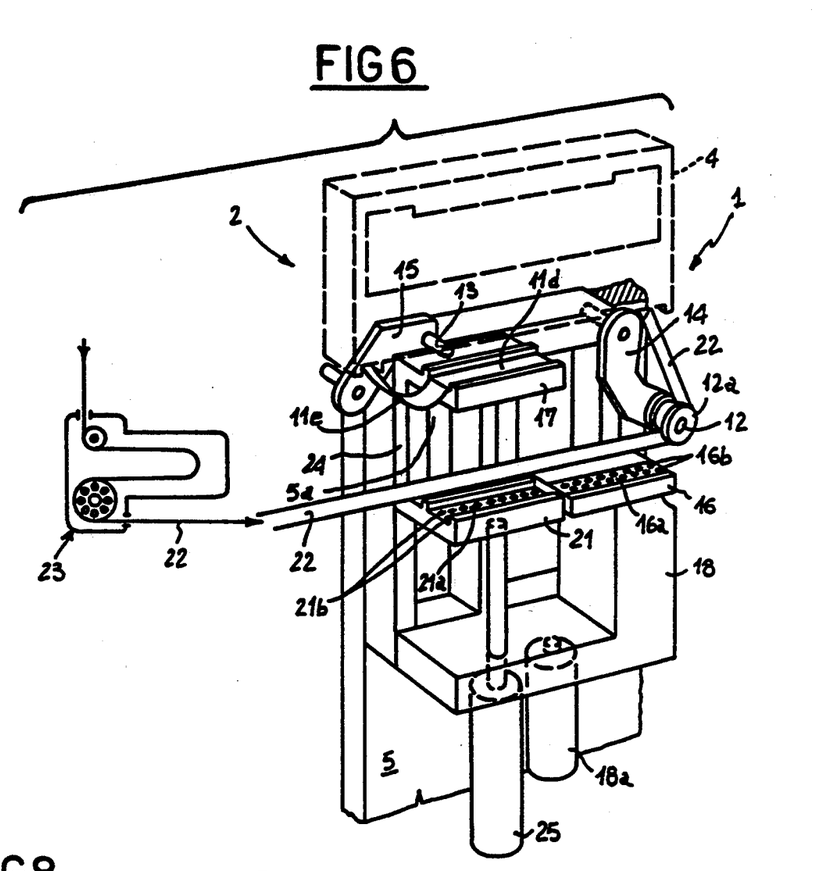
FIG. 6 is a perspective diagrammatic view showing a magnetic tape winding step within the cassette.

As diagrammatically shown in FIG. 6, the magnetic tape 22 from the control and counter unit 23 advantageously reaches the third block 21 without encountering any idler element or any other hindrance.

Figure 2:
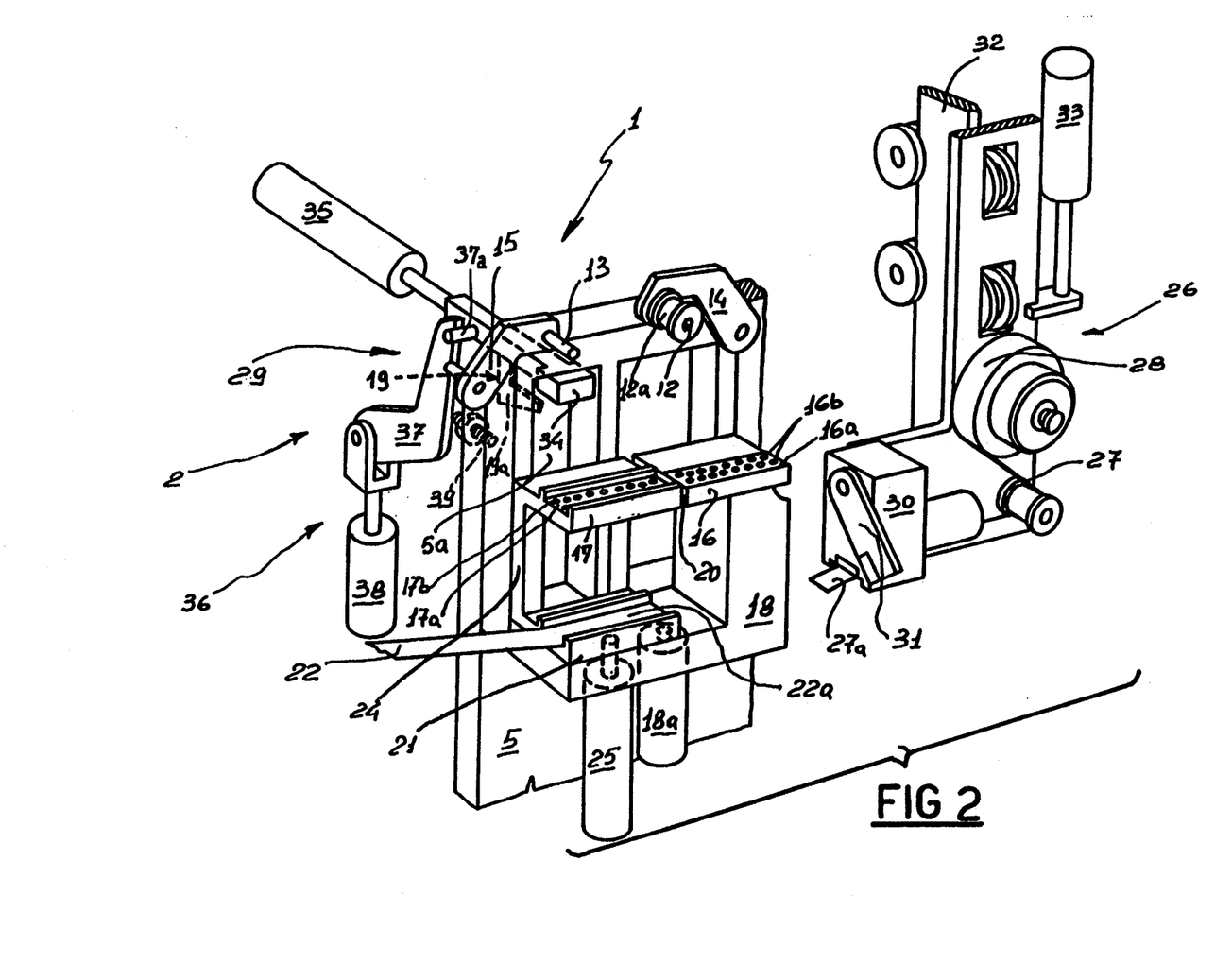
FIG. 2 is a perspective view of a portion of the cutting and splicing unit of the present invention prior to the beginning of a work cycle.
Figure 4:
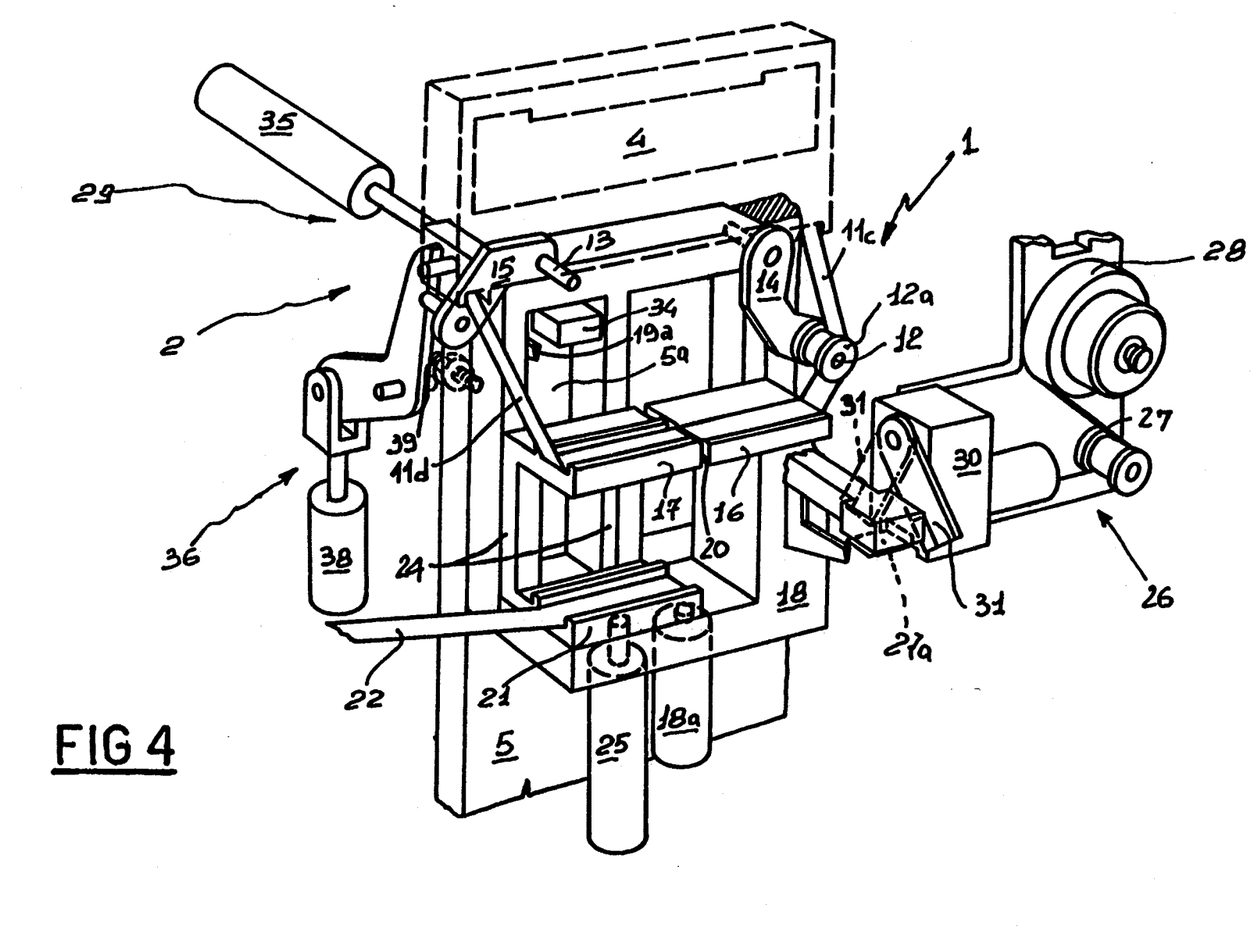
FIG. 4 is a perspective view of a portion of the cutting and splicing unit of the present invention showing a step of the operating cycle, following that of FIG. 3, related to the cutting of the leader and the picking up of a piece of adhesive tape.
Figure 5:
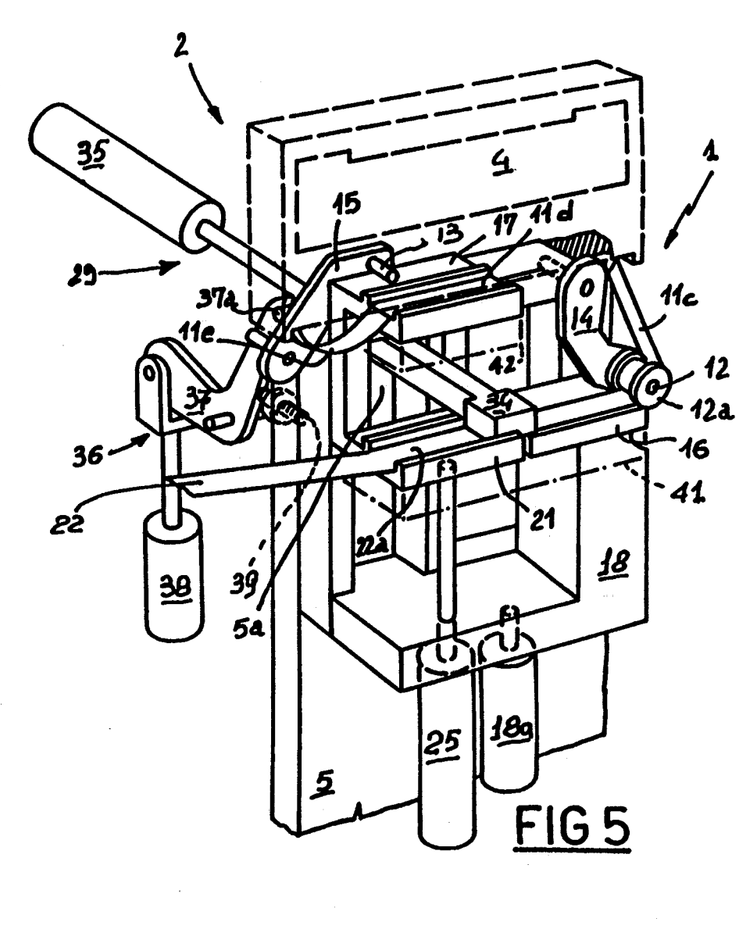
FIG. 5 is a perspective view of a portion of the cutting and splicing unit of the present invention showing the application of the adhesive tape between the magnetic tape end and a leading portion of the cut leader.

The third block 21 is movable between one position in which, as shown in FIGS. 2, 3 and 4, it is spaced apart from the first block 16, and a second position in which, as shown in FIGS. 5 and 6, the third supporting surface 21a is aligned in coplanar relation with the extension of the first supporting surface 16a.

In accordance with the present invention, the second block 17 and third block 21 are disposed so that the second and third supporting surfaces 17a and 21a are parallel to the first supporting surface 16a and consecutively offset, away from the access opening 4a, in a direction parallel to the front panel 5 and substantially perpendicular to the access opening.

The second and third blocks 17 and 21 are rigidly carried by a slider 24, slidably guided with respect to the frame 18 and movable parallelly to the front panel 5 in a direction perpendicular to the access opening 4a of the cassette 4. The movement of the slider 24, controlled by a changeover actuator 25 acting between the support frame 18 and the slider, causes the simultaneous translation of the second and third blocks 17 and 21 to the first and second operating positions.

In accordance with another feature of the present invention, operating between the front panel 5 or other fixed structure of the loading machine, and the frame 18 is a movement actuator 18a which simultaneously moves the first, second and third blocks 16, 17 and 21 between a position in which they are close to the access opening 4a of the cassette 4, such that the leader 11 is engaged on the first and second supporting surfaces 16a and 17a, and a position in which they are spaced apart from the access opening 4a. In moving between these two positions, the movement of the support frame 18 over some millimeters in a direction parallel to the front panel 5 and perpendicular to the access opening 4a is sufficient.

Also associated with the unit 1 is an adhesive tape supply unit generally denoted by 26. This supply unit 26 progressively unwinds an adhesive tape 27, from a feed roll 28 and cuts it into pieces 27a of predetermined length that are supplied, one-by-one, to application means 29. The pieces 27a are carried by the application means 29 from the supply unit 16 to the junction area between the magnetic tape 22 and leader 11.

In greater detail, the supply unit 26, comprises a stepping driving member 30 that, for each operating cycle, causes a piece 27a of adhesive tape 27, of predetermined length, to move forward until it projects from the driving member. The piece 27a is then picked up by application means 29. Acting close to the driving member 30 is a cutting member 31 which slits the adhesive tape 27 so that the piece 27a, held by the application means 29, can be used to splice the leader and magnetic tape together.

The adhesive tape supply unit 26 is preferable mounted on the front panel 5, in front of the loading station 2. This positioning permits easy access to the adhesive tape roll 28 when it needs to be replaced.

In the embodiment shown, the adhesive tape supply unit 26 is also slidably engaged on a substantially vertical guide bar 32, fastened to the front panel 5. A fluid-operated cylinder 33 enables the supply unit 26 to be moved from an operating position in which it is disposed substantially at the same level as the first block 16, to a non-use position in which it is raised with respect to the first block. This permits a handling member (not shown), to bring the magnetic tape 22 into engagement with the cutting and splicing unit 1 when a new reel is mounted in place of an out-of-tape reel.

In accordance with another feature of the present invention, the application means 29 comprises at least a gripper member 34 slidably guided along a path lying in a plane substantially parallel to the respectively aligned supporting surfaces 16a, 17a, 21a and spaced slightly apart therefrom. In other words, the gripper member 34 is movable in a horizontal direction, at right angles to the front panel 5, through an opening 5a formed therein. The gripper member 34 retains the cut-away piece 27a of adhesive tape by suction produced through a hole in the lower part of the gripper member 34.

The gripper member 34 is controlled by first movement means consisting of, for example, at least a primary fluid-operated actuator 35 operatively disposed behind the front panel 5. The actuator 35 moves the gripper member 34 from a rest position in which it is housed in the opening 5a and therefore retracted with respect to the blocks 16, 17, 21, to a grasping position in which it is disposed close to the supply unit 26 to pick up the adhesive tape piece 27a projecting from the driving member 30.

The cutting means 19 comprise a blade 19a which is removably connected to the gripper member 34. It projects downwardly from the gripper member to operate between blocks 16, 17, 21. The primary fluid-operated actuator 35 operates the cutting means 19 concurrently with the movement of the gripper member 34 from the rest position to the grasping position.

The gripper member 34 is also subject to the action of second movement means 36 which brings it from the rest position to an application position which occurs during the stroke carried out by the gripper member when it moves from the rest position to the grasping position.

In the application position, the gripper member 34 is disposed above the blocks 16, 17, 21 in side-by-side relation and faces the supporting surfaces 16a, 17a, 21a which are aligned in coplanar relation, in order to apply the piece 27a of adhesive tape to a junction area between the magnetic tape 22 and the leader 11.

In particular, the second movement means 36 comprises at least a pusher element 37 consisting of a bell crank, pivotally mounted behind the front panel 5, on an axis parallel to the extension plane thereof. The pusher element 37 is movable, upon command of an auxiliary fluid-operated actuator 38, to a position in which it does not interfere with the gripper member 34. Thus, the gripper member can move freely from its rest position, to its grasping position, to an operating position in which the pusher element 37 acts on a locating seating 37a provided in the gripper member. The action of the pusher element 37 on the locating seating 37a cause the gripper member 34 to move to the application position. The application position of the gripper member 34 can be adjusted by a threaded element 39 arranged to abut the pusher element 37 to stop the stroke in the operating position.

In operation, the cutting and splicing apparatus of the present invention begins at a start condition at which, following the replacement of an out-of-use supply reel, the magnetic tape 22 coming from the new reel associated with the loading machine is operatively engaged with the cutting and splicing unit 1.

In this situation, the supply unit 26 is maintained in a raised position, i.e. non-use condition. The first and second extractor pins 12 and 13 are also maintained at their respective rest conditions. The movement actuator 18a, acting on the frame 18, keeps the blocks 16, 17 and 21 in a position spaced apart from a cassette 4 present in the loading station 2. In addition, the second and third blocks 17, 21 are disposed, upon the action of the changeover actuator 25, in their second work positions, so that the third block 21 has its supporting surface 21a in alignment with the supporting surface 16a of the first block 16.

Under this condition, the handling member (not shown) associated with the loading machine, shifts the magnetic tape 22 end from the supply reel by rectilinear motion from the control and counter unit toward the loading station 2, passing over the first and third blocks 16, 21 that are in side-by-side relation. The magnetic tape 22 is then deposited onto the blocks and operatively engaged by an auxiliary winding member (not shown).

This auxiliary winding member, is designed to "wind-off" a predetermined amount of magnetic tape as waste before the cassette loading cycle begins. At the end of the wind-off operation, after the blocks 16, 17, 21 have been raised by the action of the movement actuator 18a, the suction action associated with the first and third supporting surfaces 16a, 21a is activated, enabling the magnetic tape 22 to be held on blocks 16, 21. The movement actuator 18a then brings blocks 16, 17, 21 back to a spaced apart position and the magnetic tape 22 is slit by the blade 19a, controlled by the primary fluid-operated actuator 35. The waste tape, which ends up on the auxiliary winding member, is removed from the loading station 2 and disengaged from the first block 16.

At this point, the supply unit 26 is brought back to the operating position and the changeover actuator 25 brings the second and third blocks 17 and 21 to the first operating position to start the actual cassette loading cycle.

The extractor pins 12 and 13, previously introduced into the access space 4c of the cassette 4, are simultaneously brought from the rest position to the operating position. The leader 11 is thus extracted from the cassette access opening 4a and laid down on the first and second blocks 16 and 17, as shown in FIG. 3.

Concurrently with the extraction of the leader 11, operation of the movement actuator 18a occurs, which causes the displacement of blocks 16, 17 and 21 to a position close to the access opening 4a, so that the first and second supporting surfaces 16a and 17a, initially spaced apart from the leader 11, come into contact with the leader and hold it by suction produced through holes 16b, 17b.

The second pin 13 is then brought to the rest position and blocks 16, 17, 21 are lowered again so that they are moved apart from the opening 4a, to enable operation of the gripper member 34 and cutting means 19.

Upon command of the primary fluid-operated actuator 35, the gripper member 34 is brought from the rest position to the grasping position, as shown in FIG. 4. During this displacement, the blade 19a, fastened at its lower end to the gripper member 34, enters the slot 20 defined between the first and second blocks 16 and 17. This causes the leader 11 to be severed into leading 11c and trailing 11d portions, respectively engaged by the first and second blocks 16, 17.

In the grasping position, the gripper member 34 is close to the stepping driving member 30 and is located over the adhesive tape piece 27a projecting from the driving member, as shown in FIG. 2. This adhesive tape piece 27a, held by the suction produced through the opening in the lower part of the gripper member 34, is cut by the cutting member 31 and then carried by the gripper member back to the rest position.

At this point the changeover actuator 25 moves the second and third blocks 17, 21 to the second operating position so that the third supporting surface 21a, and consequently the magnetic tape end 22a, are brought into alignment with the first supporting surface 16a supporting the leading portion 11c of leader 11. The trailing portion 11d, following the lifting of the second block 17 to the second operating position, forms a curve 11e shown in FIGS. 5 and 6.

At this point, the tape 22 is joined to the leading portion 11c of leader 11. This is accomplished by moving the auxiliary actuator 38 to cause the gripper member 34 to move forward to the application position, i.e. the position above the junction area between the tape 22 and the leader 11.

Upon command of the movement actuator 18a, blocks 16, 17, 21 are raised so that the junction area between the tape 22 and leading portion 11c of leader 11 is brought into contact with the adhesive tape piece 27a held by the gripper member 34. In this way, the adhesive tape piece 27a is applied to the magnetic tape 22 and the leading portion 11c to create a splice joint.

Blocks 16, 17, 21 are lowered again to the position in which they are spaced apart from the access opening 4a, as shown by dotted lines 41, 42 in FIG. 5. The gripper member 34 is brought to the rest position to enable the magnetic tape winding step to begin. The winding operation is then carried out by rotating the first winding hub 11a in the cassette 4.

As diagrammatically shown in FIG. 6, the magnetic tape 22 coming from the control and counter unit 23 reaches the idler roller 12a on the first extractor pin 12 without encountering any obstruction along its path. In particular, the magnetic tape 22 passes above the first and third blocks 16, 21 without touching them, as the blocks have been shifted to their spaced apart position. The idler roller 12a is therefore the only element encountered by the tape 22 before entering the cassette 4.

When the desired amount of magnetic tape 22 has been wound into the cassette 4, the rotation of the first winding hub 11a is stopped and the movement actuator 18 is operated again to cause the displacement of blocks 16, 17 and 21 so that they are close to the opening 4a. Thereafter they are immediately returned to their spaced apart position leaving the tape 22, retained on the first and third supporting surfaces 16a, 21a due to the suction produced at the surfaces. The primary actuator 35 is then operated to cause the gripper member 34 to move from the rest position to the grasping position. Simultaneously, the blade 19a passes between the first and third blocks 16, 21 thereby cutting the magnetic tape 22.

In the same manner as above described, a new piece 27a of adhesive tape is picked up by the gripper member 34. The changeover actuator 25 then brings the first and third blocks 17, 21 to the first operating position. In this way the trailing portion 11d of leader 11 is brought into alignment with the end portion 22b of the magnetic tape 22 coming from the cassette 4.

Figure 7:
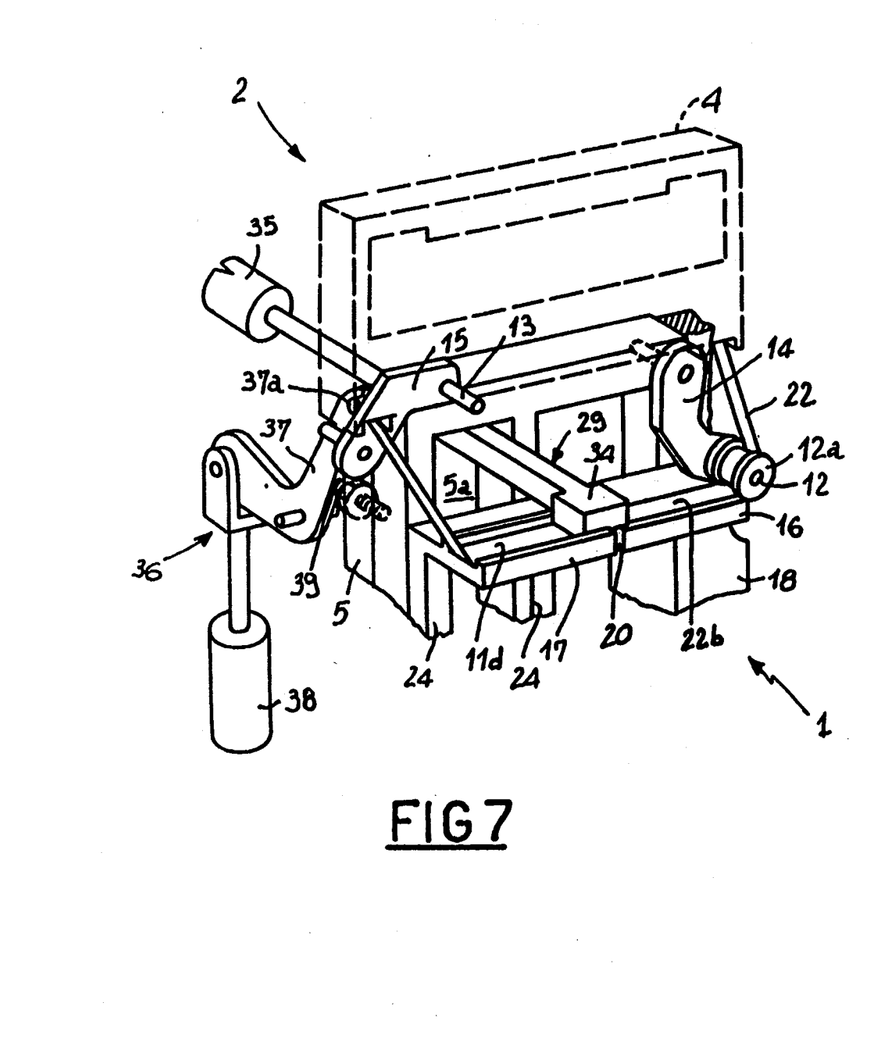
FIG. 7 is a perspective view of a portion of the cutting and splicing unit of the present invention showing the execution of the splicing between an end portion of the magnetic tape and a trailing portion of the cut leader.

As shown in FIG. 7, the auxiliary actuator 38 brings the gripper member 34 to the application position. The raising of blocks 16, 17, 21 actually causes the affixation of the adhesive tape piece 27a to the junction area between the trailing portion 11d of the leader and end portion 22b of the magnetic tape 22.

The gripper member 34 is then brought back to the rest position and a further rotation is imparted to the first or second winding hubs 11a, 11b to cause the end portion 22b of the tape 22 and trailing portion 11d of the leader 11 to be wound into the cassette 4.

The cassette 4 can then be ejected from the loading station 2, when the positioning plate 9 has been moved away from the front panel 5. The completely loaded cassette can be dropped onto a chute 40 guiding it to a conveyor belt (not shown) or simply dropped into a stationary collection rack (not shown).

The positioning plate 9 then receives a new cassette 4 to be loaded, and the described operating cycle can begin again.

The present invention permits the satisfactory loading of tape even when the leader provided in the cassettes is of relatively short length. It should be noted that in the accompanying drawings, both the length of the leader and the distance between the blocks have been enlarged for the sake of clarity. However, in practice, the members present in the device operate in a space occupying a few cm³ adjacent the cassette access opening.

Further, the association of the cutting means 19 with the gripper member 34 represents an important improvement in the structural simplification of the cutting and splicing unit. It also reduces the time necessary to carry out the cassette loading operating cycle.

The above description of the invention is intended to be illustrative and not limiting. Modifications and variations may occur to one of skill in the art without departing from the spirit or scope of the invention.

What is claimed:

1. A cutting and splicing unit for automatic cassette loading machines comprising:
    extractor means arranged to operatively engage a leader having its ends engaged to first and second winding hubs respectively, in order to bring the leader from a rest condition in which it extends along an access opening provided in the cassette to an extraction position in which it is extended above the access opening outside the cassette;
    cutting means for severing the leader, held in said extracted position, into a leading portion connected to the first winding hub, and a trailing portion connected to the second winding hub;
    a first block arranged to hold the leading portion of the leader on a first supporting surface;
    a second block arranged to hold the trailing portion of the leader on a second supporting surface, said second block being movable between a first position in which the second supporting surface is aligned substantially the first supporting surface, in coplanar relation therewith, and a second position in which the second block is spaced apart from the first block;
    a third block disposed to hold an end of magnetic tape from a supply reel on a third supporting surface, said third block being movable between a first position in which it is spaced apart from the first block and a second position in which the third supporting surface is substantially aligned with the first supporting surface, in coplanar relation therewith;
    an adhesive tape supply unit arranged to supply and cut an adhesive tape into pieces of predetermined length;
    adhesive tape applying means for individually picking up the pieces of adhesive tape supplied by the supply unit and applying them to a junction area between the magnetic tape and the leader held on said first, second and third blocks;
    a slider carrying said second and third blocks, wherein said second and third supporting surfaces are disposed parallelly to the first supporting surface and consecutively offset from the cassette access opening in a direction parallel to a front panel and substantially perpendicular to the access opening;
    a support frame slidably engaging the slider in a direction substantially perpendicular to the cassette access opening; and
    a changeover actuator acting between the support frame and the slider to carry out the displacement of the second and third blocks between the first and second positions.

2. A unit as claimed in claim 1, further comprising a movement actuator to simultaneously shift the first, second and third blocks between a first position in which they are close to the cassette access opening such that the engagement of the leader on said first and second supporting surfaces takes place, and a second position in which they are spaced apart from the access opening.

3. A unit as claimed in claim 1, wherein said extractor means comprises at least first and second extractor pins individually and selectively movable from a rest position in which they are housed in an access space formed along said access opening to an operating position in which they extend outside the access opening to hold the leader in said extracted position.

4. A unit as claimed in claim 3, wherein rotatably associated with said first extractor pin, which is arranged to engage the leading portion of the leader, is an idler roller for guiding the magnetic tape towards the inside of the cassette being loaded.

5. A unit as claimed in claim 1, wherein said application means comprises:
    at least a gripper member arranged to removably engage the piece of adhesive tape supplied from the supply unit, said gripper member being slidably guided in a path lying in a plane substantially parallel to and slightly spaced apart from said supporting surfaces;
    first movement means operating on the gripper member for shifting said gripper member from a rest position in which it is retracted with respect to said first, second and third blocks, and a grasping position in which it is disposed close to the supply unit for picking up said piece of adhesive tape; and
    second movement means operating on the gripper member for bringing it from the rest position to an application position in which said gripper member faces said supporting surfaces aligned in coplanar relation, to apply the piece of adhesive tape to a junction area between said magnetic tape and said leader.

6. A unit according to claim 5, wherein said adhesive tape supply unit is mounted in front of the loading machine front panel and wherein said application position is between the rest position and the grasping position of said gripper member.

7. A unit as claimed in claim 6, wherein said first movement means comprises at least a primary fluid-operated actuator disposed behind said front panel.

8. A unit as claimed in claim 6, wherein said second movement means comprises at least a pusher element movable upon command of an auxiliary fluid-operated actuator, from a position in which it does not interfere with the gripper member, to an operating position in which it acts on a locating seating carried by the gripper member to bring it to the application position.

9. A unit as claimed in claim 8, further comprising at least a threaded adjustment element arranged to act in abutment against the pusher element to stop the stroke in the operating position.

10. A unit as claimed in claim 2, wherein said application means comprises:
    a gripper member arranged to removably engage the adhesive tape piece supplied from the supply unit, said gripper member being slidably guided in a path lying in a plane substantially parallel to and slightly spaced apart from said supporting surfaces aligned in coplanar relation;
    first movement means operating on the gripper member in order to shift it between a rest position in which it is retracted with respect to said blocks and a grasping position in which it is located close to the supply unit for picking up said adhesive tape piece; and second movement means operating on the gripper member for bringing it from said rest position to an application position in which said gripper member faces said supporting surfaces aligned in mutual coplanar relation, in order to apply the adhesive tape piece to a junction area between said magnetic tape and said leader.

11. A unit as claimed in claim 6, wherein said cutting means comprises at least a blade fastened to the gripper member and arranged to pass between the first, second and third blocks when said blocks are variously aligned in co-planar relation and when the gripper moves between the rest and grasping positions.

12. A unit as claimed in claim 1, wherein said adhesive tape supply unit is located in front of said front panel and is movable between a use position in which it is disposed substantially at the same level as the first block and a non-use position in which it is raised apart from the first block.

13. An apparatus for splicing tape comprising:
first tape support means;
second and third tape support means, fixed relative to one another and extending substantially parallel to one another so that said first, second and third tape support means reside in a common plane;
means for imparting relative reciprocal movement between said first tape support means on the one hand and said second and third tape support means on the other hand; and
means for simultaneously imparting movement to said first, second and third tape support means to bring said first and second tape support means or said first and third tape support means, respectively, into engagement with splicing tape applicator means to thereby affix splicing tape to pieces of tape supported on said first and second tape support means or said first and third tape support means.

14. A method of loading tape into a cassette comprising the following steps:
engaging use tape on a first tape support block;
extracting leader tape from a cassette;
engaging said extracted leader tape on second and third support blocks;
slitting said extracted leader tape between said second and third support blocks;
shifting said first and second support blocks to align said use tape on said first support block with leader tape on said third support block;
moving said first, second and third support blocks from a first position to a second position to bring said aligned use tape and leader tape into engagement with tape applicator means to affix a piece of splicing tape joining said use tape and leader tape;
moving said first, second and third support blocks away from said tape applicator means;
winding use tape into the cassette;
slitting said use tape between said first and third support blocks;
shifting said first and second support blocks to align the use tape on said third support block with the leader tape on said second support block;
moving said first, second and third support blocks from said first to said second position to bring the aligned use tape and leader tape into engagement with said tape applicator means to affix a piece of splicing tape joining the use tape and leader tape; and
moving said first, second and third support blocks away from said tape applicator means.

15. A method according to claim 14, comprising the additional steps of:
shifting said first, second and third support blocks from said first position to said second position to engage the extracted leader tape on said second and third support blocks; and
shifting said first, second and third support blocks from said second position to said first position.

16. A method according to claim 14, comprising the additional steps of:
moving said tape applicator means from a first position to a second position;
cutting a piece of splicing tape fed by splicing tape feed means;
engaging said cut piece of splicing tape on said tape applicator means;
moving said tape applicator means from said second position to said first position;
moving said tape applicator means to a third position in which it is engaged by said first and third support blocks carrying aligned use tape and leader tape to apply said cut piece of splicing tape thereby joining said use tape and leader tape.

17. A method according to claim 16, comprising the additional steps of:
moving said tape applicator means from a first position to a second position;
cutting a piece of splicing tape fed by splicing tape feed means;
engaging said cut piece of splicing tape on said tape applicator means;
moving said tape applicator means from said second position to said first position;
moving said tape applicator means to a third position in which it is engaged by said second and third support blocks carrying aligned use tape and leader tape to apply said cut piece of splicing tape thereby joining said use tape and leader tape.

18. A method according to claim 14, wherein the shifting of said first and second support blocks and the moving of said first, second and third support blocks occur along a common plane.

19. A method according to claim 18, wherein said common plane is a vertical plane along the face of a machine with which said support blocks are operatively associated.

20. An apparatus for splicing tape comprising:
first, second and third tape support means;
arm means operatively interacting with said first, second and third tape support means, wherein said arm means is movable between a first rest position, a second splicing tape pick-up position and a third splicing tape application position;
means for moving said second and third tape support means relative to said first tape support means between a first position in which said second tape support means is aligned with said first tape support means and a second position in which said third tape support means is aligned with said first tape support means;
means for shifting said first, second and third tape support means between a first position and a second position, such that said first and third tape support means or said first and second tape support mean engage said arm means in its third splicing tape application position to apply splicing tape, picked up by said arm means in said second splicing tape pick-up position, to join tape supported on aligned tape support means.

21. An apparatus according to claim 20, wherein said arm meas comprises vacuum head means for holding the splicing tape picked up in said second splicing tape pick-up position.

22. An apparatus according to claim 20, wherein said arm means comprises cutting means for cutting tape supported on aligned tape support means as said arm means moves from said first rest position to said second splicing tape pick-up position.

* * * * *